US011277251B1

(12) United States Patent
Millard et al.

(10) Patent No.: US 11,277,251 B1
(45) Date of Patent: Mar. 15, 2022

(54) RADIO FREQUENCY SPECTRUM MANAGEMENT SYSTEM AND METHOD

(71) Applicants: Michael Patrick Millard, Coral Springs, FL (US); Howard Melamed, Coral Springs, FL (US); Stevan Melamed, Boca Raton, FL (US)

(72) Inventors: Michael Patrick Millard, Coral Springs, FL (US); Howard Melamed, Coral Springs, FL (US); Stevan Melamed, Boca Raton, FL (US)

( * ) Notice: Subject to any disclaimer, the term of this patent is extended or adjusted under 35 U.S.C. 154(b) by 145 days.

(21) Appl. No.: 16/502,380

(22) Filed: Jul. 3, 2019

(51) Int. Cl.
| H04B 7/26 | (2006.01) |
| H04L 5/00 | (2006.01) |
| H04W 72/08 | (2009.01) |
| H04B 17/354 | (2015.01) |
| H04B 17/336 | (2015.01) |

(52) U.S. Cl.
CPC ......... *H04L 5/0096* (2013.01); *H04B 17/336* (2015.01); *H04B 17/354* (2015.01); *H04L 5/006* (2013.01); *H04W 72/082* (2013.01)

(58) Field of Classification Search
CPC ............. H04W 16/14; H04W 72/0453; H04W 74/0808; H04W 88/16; H04W 4/70; H04W 24/08; H04W 84/12; H04W 72/04; H04Q 7/20; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| 4,016,565 | A | | 4/1977 | Walker |
| 4,468,656 | A | | 8/1984 | Clifford |
| 4,723,311 | A | | 2/1988 | Moustakas et al. |
| 4,727,537 | A | | 2/1988 | Nichols |
| 4,825,435 | A | | 4/1989 | Amundsen et al. |
| 4,990,814 | A | | 2/1991 | Tanski et al. |
| 5,442,168 | A | | 8/1995 | Gurner et al. |
| 5,475,866 | A | * | 12/1995 | Ruthenberg .......... H04W 16/14 455/454 |
| 5,568,476 | A | | 10/1996 | Sherer et al. |
| 5,881,105 | A | | 3/1999 | Balachandran et al. |
| 5,884,040 | A | | 3/1999 | Chung |
| 5,930,696 | A | | 7/1999 | Tzuang |
| 5,966,646 | A | | 10/1999 | Lampe et al. |
| 6,442,168 | B1 | | 8/2002 | Vasa |

(Continued)

*Primary Examiner* — Jung Liu
(74) *Attorney, Agent, or Firm* — Malloy & Malloy, P.L.

(57) ABSTRACT

A radio frequency spectrum management system and method for detecting and redirecting interfering radio frequency signals includes one or more radio frequency spectrum management device, each device having an antenna to scan a device area of influence and detect interfering radio frequency signals. A radio frequency spectrum management device also includes a controller to analyze detected interfering radio frequency signals and to delineate operative parameters for redirecting clearance signals. A radio frequency transmitter transmits redirecting clearance signals over the device area of influence via the antenna, in accordance with the operative parameters for redirecting clearance signals delineated by the controller. A radio signal amplifier boosts a redirecting clearance signal to a predetermined clearance signal amplitude.

7 Claims, 7 Drawing Sheets

(56) References Cited

U.S. PATENT DOCUMENTS

| | | | |
|---|---|---|---|
| 6,683,567 B2 | 1/2004 | De Champlain et al. | |
| 6,774,845 B2 | 8/2004 | De Champlain | |
| 6,868,314 B1 | 3/2005 | Frink | |
| 6,992,614 B1 | 1/2006 | Joyce | |
| 7,039,414 B1* | 5/2006 | Nasshan | H04W 16/14 455/448 |
| 7,206,569 B2 | 4/2007 | Erskine et al. | |
| 7,218,912 B2 | 5/2007 | Erskine et al. | |
| 7,224,750 B2 | 5/2007 | Kim et al. | |
| 7,236,766 B2 | 6/2007 | Freeburg | |
| 7,283,840 B2 | 10/2007 | Cho | |
| 7,330,500 B2 | 2/2008 | Kouki | |
| 7,336,939 B2 | 2/2008 | Gomez | |
| 7,339,981 B2 | 3/2008 | Dogan | |
| 7,403,773 B2 | 7/2008 | Kappes et al. | |
| 7,593,706 B2 | 9/2009 | Bucknor et al. | |
| 7,668,505 B2 | 2/2010 | Vacanti | |
| 7,683,782 B2 | 3/2010 | Christopher | |
| 7,696,919 B2 | 4/2010 | Moraites | |
| 7,746,052 B2 | 6/2010 | Noujeim | |
| 7,853,261 B1 | 12/2010 | Lewis et al. | |
| 8,060,009 B2 | 11/2011 | Gainey et al. | |
| 8,164,440 B2 | 4/2012 | Lontka | |
| 8,169,369 B2 | 5/2012 | Gonzalez et al. | |
| 8,204,494 B2 | 6/2012 | Weinzierl | |
| 8,305,196 B2 | 11/2012 | Kennedy et al. | |
| 8,483,703 B2 | 7/2013 | Swope et al. | |
| 8,543,053 B1 | 9/2013 | Melamed et al. | |
| 8,655,348 B2 | 2/2014 | Zha | |
| 8,750,903 B1 | 6/2014 | Fitzsimmons et al. | |
| 8,761,687 B2 | 6/2014 | Chang et al. | |
| 8,798,922 B1 | 8/2014 | Tillotson | |
| 8,805,285 B2* | 8/2014 | Thota | H04B 15/00 455/63.1 |
| 8,824,966 B2 | 9/2014 | Boes | |
| 8,903,304 B2 | 12/2014 | Coleman | |
| 8,955,110 B1 | 2/2015 | Twitchell | |
| 9,048,944 B2 | 6/2015 | Boes | |
| 9,059,782 B2 | 6/2015 | Desai et al. | |
| 9,204,488 B2 | 12/2015 | Bai | |
| 9,246,629 B2 | 1/2016 | Coleman | |
| 9,288,751 B2 | 3/2016 | Finkelstein et al. | |
| 9,529,360 B1 | 12/2016 | Melamed | |
| 9,572,176 B2 | 2/2017 | Desai et al. | |
| 9,797,978 B1 | 10/2017 | Melamed | |
| 9,847,035 B1 | 12/2017 | Melamed | |
| 10,234,857 B1 | 3/2019 | Melamed | |
| 10,374,732 B1 | 8/2019 | Melamed | |
| 2001/0033600 A1 | 10/2001 | Yang et al. | |
| 2003/0174763 A1 | 9/2003 | Kouki | |
| 2004/0057537 A1 | 3/2004 | Kim | |
| 2004/0130488 A1 | 7/2004 | De Champlain | |
| 2004/0166878 A1 | 8/2004 | Erskine et al. | |
| 2004/0203748 A1 | 10/2004 | Kappes et al. | |
| 2005/0040909 A1 | 2/2005 | Waight | |
| 2005/0108374 A1 | 5/2005 | Pierzga | |
| 2006/0063485 A1 | 3/2006 | Gainey et al. | |
| 2006/0188033 A1 | 8/2006 | Zehavi et al. | |
| 2007/0060055 A1 | 5/2007 | Desai | |
| 2007/0099667 A1 | 5/2007 | Graham et al. | |
| 2007/0285280 A1 | 12/2007 | Robinson et al. | |
| 2009/0061870 A1 | 3/2009 | Finkelstein et al. | |
| 2009/0098847 A1 | 4/2009 | Noujeim | |
| 2009/0111463 A1* | 4/2009 | Simms | H04W 16/14 455/424 |
| 2009/0163237 A1* | 6/2009 | Abedi | H04W 16/14 455/501 |
| 2009/0174589 A1 | 7/2009 | Moraites | |
| 2010/0150209 A1 | 6/2010 | Gonzalez | |
| 2010/0272012 A1 | 10/2010 | Knefelkamp | |
| 2011/0002687 A1 | 1/2011 | Sabat, Jr. et al. | |
| 2011/0117870 A1 | 5/2011 | Pera | |
| 2011/0306367 A1* | 12/2011 | Cahill | H04W 16/14 455/464 |
| 2012/0057566 A1 | 3/2012 | Ahmadi | |
| 2012/0235881 A1 | 9/2012 | Pan | |
| 2012/0299765 A1 | 11/2012 | Huang et al. | |
| 2012/0309288 A1 | 12/2012 | Lu | |
| 2012/0322459 A1 | 12/2012 | Jaffri et al. | |
| 2013/0002266 A1* | 1/2013 | Kraft | A61B 5/14532 324/613 |
| 2013/0099975 A1 | 4/2013 | Cyganski et al. | |
| 2013/0244712 A1 | 9/2013 | Kuzio et al. | |
| 2013/0316659 A1 | 11/2013 | Ylamurto | |
| 2014/0253378 A1 | 9/2014 | Hinman | |
| 2014/0269650 A1 | 9/2014 | Sahota | |
| 2014/0274094 A1* | 9/2014 | Abdelmonem | H04L 5/0026 455/452.1 |
| 2014/0277854 A1 | 9/2014 | Jones | |
| 2014/0344927 A1 | 11/2014 | Turgeman et al. | |
| 2015/0133067 A1 | 5/2015 | Chang et al. | |
| 2015/0214926 A1 | 7/2015 | Tohidian et al. | |
| 2015/0226834 A1 | 8/2015 | Floch | |
| 2015/0278140 A1 | 10/2015 | Motos | |
| 2015/0304783 A1 | 10/2015 | Haubrich et al. | |
| 2015/0304869 A1 | 10/2015 | Johnson | |
| 2015/0312835 A1 | 10/2015 | Subramanian | |
| 2015/0370250 A1 | 12/2015 | Bachrach | |
| 2016/0088485 A1* | 3/2016 | Guo | H04W 16/14 370/329 |
| 2016/0274229 A1 | 9/2016 | Oh | |
| 2018/0323815 A1* | 11/2018 | Beadles | H04B 1/123 |
| 2019/0335460 A1* | 10/2019 | Liu | H04W 24/08 |
| 2020/0322960 A1* | 10/2020 | Monajemi | H04B 17/373 |
| 2020/0336015 A1* | 10/2020 | Elliott | H04L 67/32 |

* cited by examiner

RADIO FREQUENCY SPECTRUM MANAGEMENT SYSTEM AND METHOD

BACKGROUND OF THE INVENTION

Field of the Invention

The present invention is directed to a radio frequency spectrum management system and method for detecting interfering radio frequency signals being transmitted in a managed radio frequency spectrum bandwidth over an area of influence, and redirecting the interfering radio frequency signals.

Description of the Related Art

The radio frequency spectrum is a finite resource that must be utilized in a controlled manner. Uncontrolled use of the radio frequency spectrum often results in unintended harmful interference. The two primary means by which governmental or other regulatory agencies are able to control use of the radio frequency spectrum, and prevent harmful radio interference, are via radio frequency spectrum licensing, and the establishment of technical specifications regulating devices that transmit and/or receive radio frequency signals or energy.

One example of a popular regulatory mechanism for the controlled use of a portion of the radio frequency spectrum is the Digital Enhanced Cordless Telecommunications ("DECT") specification. More in particular, DECT defines the worldwide standard for cordless telephony, which is popular in homes, small offices, and enterprise deployments. With the standardization and widespread production of DECT devices, many consumers and businesses have adopted this wireless technology for voice communication and low-speed data applications. DECT is immensely popular worldwide, including in the United States.

The DECT specification was developed by the European Telecommunications Standards Institute as a wireless protocol capable of carrying voice and low-rate data traffic throughout Europe, the Middle East, and Africa. Initially popular in European countries for voice and data communications, DECT has been widely adopted throughout the world as a standard for home and business cordless telephony.

The DECT specification makes it ideal for use in short to medium range telephony, serving the need for cordless phones in the home, as well as in the Private Automatic Branch Exchange ("PABX") market, which provides wireless access within a building or campus environment. Overwhelmingly, DECT technology has been successful in the residential and small office market in Europe, and in North America as an alternative to proprietary short-range cordless phone technology. As a standards-based technology, DECT excels over existing short-range cordless phone technologies by avoiding interference with other technologies crowding the popular Industrial, Scientific, and Medical ("ISM") frequency bandwidth. In the United States, the regulatory rules for device operation within the ISM bandwidth are codified in Title 47 of the U.S. Code of Federal Regulations, Part 18.

In most countries, DECT devices operate on a 20 MHz range of the overall radio frequency spectrum, namely, from 1880 MHz to 1900 MHz. Because the adoption of DECT technology did not occur everywhere simultaneously, some countries were unable to allocate this same spectrum bandwidth for DECT use because that portion of the radio frequency spectrum was already in use for other services. For example, while European countries have allocated the 1880 MHz to 1900 MHz range of the radio frequency spectrum for DECT transmissions, in the United States, that same 20 MHz range of the radio frequency spectrum is used by companies such as AT&T, Verizon, Sprint and T-Mobile to provide cellular-type phone service to the public via established Commercial Mobile Radio System ("CMRS") specifications. Because the 1880 MHz to 1900 MHz range of the radio frequency spectrum has already been allocated for other transmissions in the United States, the U.S. has allocated the 1920 MHz to 1930 MHz range of the radio frequency spectrum for DECT transmissions. Other countries that were similarly situated allocated a range of the radio frequency spectrum for DECT spectrum in accordance with radio frequency spectrum bandwidth available for DECT use in their respective jurisdictions.

As noted above, radio interference arises as a consequence of DECT devices operating on non-allocated portions of the radio frequency spectrum. For example, when a European DECT device is operated in the United States in the 1880 MHz to 1900 MHz range of the radio frequency spectrum, the DECT transmissions will collide with the cellular-type wireless phone service transmissions, and vice-versa, thereby causing potentially harmful interference.

More in particular, collision of the uncontrolled DECT transmissions causes both the CMRS and DECT networks to suffer impaired communications, higher than normal bit-rate errors, and other undesirable consequences. These impairments typically reduce network coverage range, audio quality and digital data transmission throughput rates. In more egregious cases, the interference caused by the collision of incompatible radio devices results in dropped calls and/or an inability of affected devices to connect to their respective network at all.

Eliminating this interference requires physically identifying and locating the device(s) that are operating on an unauthorized spectrum according to their present geographic location. For example, a yacht equipped with an operational European band DECT cordless phone system would need to be physically and uniquely identified whenever that yacht entered or traversed the waterways of the United States. Once identified, the owner or operator of the vessel is notified that its DECT device is creating harmful interference as a consequence of operating on the unauthorized spectrum, and that the DECT device requires re-programming or adjustment (in the case of DECT equipment capable of worldwide operation in alternate radio frequency spectrums), or system disablement (in the case of DECT equipment incapable of operating in alternate radio frequency spectrums).

The harmful interference to domestic wireless service providers caused by the operation of "non-U.S." DECT devices can be abated on a case-by-case basis by locating the DECT device(s) via radio frequency triangulation methods. Once located, the offending DECT may be deactivated, or adjusted to operate in the U.S. allocated DECT radio frequency spectrum bandwidth.

As will be appreciated by those of skill in the art, case-by-case approaches are labor-intensive as they typically require multiple measurements of the radio-frequency field strength to "zero-in" on the offending device. The triangulation effort is even more difficult in those cases where a DECT device is in transit, for example, onboard a moving yacht or other seafaring vessel.

Further complicating the effort to triangulate and identify interfering device(s) is the fact that both the CMRS and DECT/DECT 6.0 standards implement various means to avoid interference. In the case of CMRS networks, one means to avoid interference is the refusal to assign impaired spectrum bandwidth for use by its associated mobile subscribers. This denial action directly reduces network capacity while simultaneously placing a greater reliance on unimpaired adjacent portions of the radio frequency spectrum. Due to the inherent dynamic range limitations of typical sweep-mode and FFT portable spectrum analyzers, the increased reliance on adjacent spectrum bandwidth to carry traffic that would ordinarily be carried on unimpaired spectrum bandwidth makes field measurements of the spectrum more difficult, particularly in the presence of strong CMRS downlink radiation. In the case of DECT/DECT 6.0, the equipment is designed to operate on the Least Interfered Channel ("LIC"), or optionally, to switch channels automatically in the presence of objectionable interference. Since both networks are essentially moving in time, space and frequency with respect to the triangulation efforts, it is not surprising that locating and identifying offending devices in situ can be extremely difficult and challenging, at best.

It is therefore an object of the present invention to automatically detect interfering radio frequency signals, e.g., DECT radio transmissions, in an area of influence allocated to other radio services, e.g., a CMRS. Once detected, deliberately exploit a requirement within the DECT standard to force the DECT equipment to switch to a more desirable (i.e., less interference-causing) channel.

It is another object of the present invention to provide an effective and automatic countermeasure to undesirable interfering radio frequency signals, such as U.S. allocated DECT equipment, by exploiting the spectrum-sharing scheme of the interfering equipment.

It is another object of the present invention to limit or restrict the spectrum available to interfering radio signal transmission equipment to the extent necessary or desirable for use by specifically allocated radio services, including, by way of example, CMRS.

It is another object of the present invention to broadcast the minimum radio-frequency output necessary to exploit the spectrum-sharing scheme of the interfering equipment, such as DECT equipment spectrum sharing schemes, thereby maximizing the amount of interference-free spectrum available for use to specifically allocated radio services, once again, including CMRS.

It is another object of the present invention to provide operational control of narrowband radio-frequency signals such that compliance with governmental radio regulations is achieved.

It is another object of the present invention to provide, where deemed desirable, at least one DECT carrier for use by potentially interfering DECT device(s) thereby avoiding any applicable regulatory prohibition on jamming the radio spectrum, or radio services using that spectrum.

SUMMARY OF THE INVENTION

The present invention is directed to a radio frequency spectrum management system for detecting and redirecting interfering radio frequency signals. The system comprises at least one radio frequency spectrum management device, however, in accordance with at least one embodiment of the present invention, the system comprises a plurality of radio frequency spectrum management devices.

A radio frequency spectrum management device in accordance with the present invention includes an antenna, the antenna at least partially defining a device area of influence. More in particular, in at least one embodiment, an antenna scans the device area of influence and detects interfering radio frequency signals. A radio frequency spectrum management device further comprises a controller to analyze the detected interfering radio frequency signals and further, to delineate a set of operative parameters for a redirecting clearance signal.

In one further embodiment of the present system, a radio frequency spectrum management device includes a radio frequency transmitter to transmit the redirecting clearance signal, in accordance with the set of operative parameters for the redirecting clearance signal as delineated by the controller, over the device area of influence via the antenna. In yet one further embodiment, a radio frequency spectrum management device comprises a radio signal amplifier to boost a redirecting clearance signal to a predetermined clearance signal amplitude.

The present invention is further directed to a method for radio frequency spectrum management. In accordance with at least one embodiment, the present method comprises scanning a managed radio frequency spectrum within an area of influence for interfering radio frequency signals; detecting an interfering radio frequency signal within the managed radio frequency spectrum; delineating a set of operative parameters for a redirecting clearance signal; activating a radio frequency spectrum management device; transmitting at least one redirecting clearance signal from the radio frequency transmitter; deactivating the radio frequency transmitter; and rescanning the managed radio frequency spectrum within the area of influence for interfering radio frequency signals.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

Figure 6:
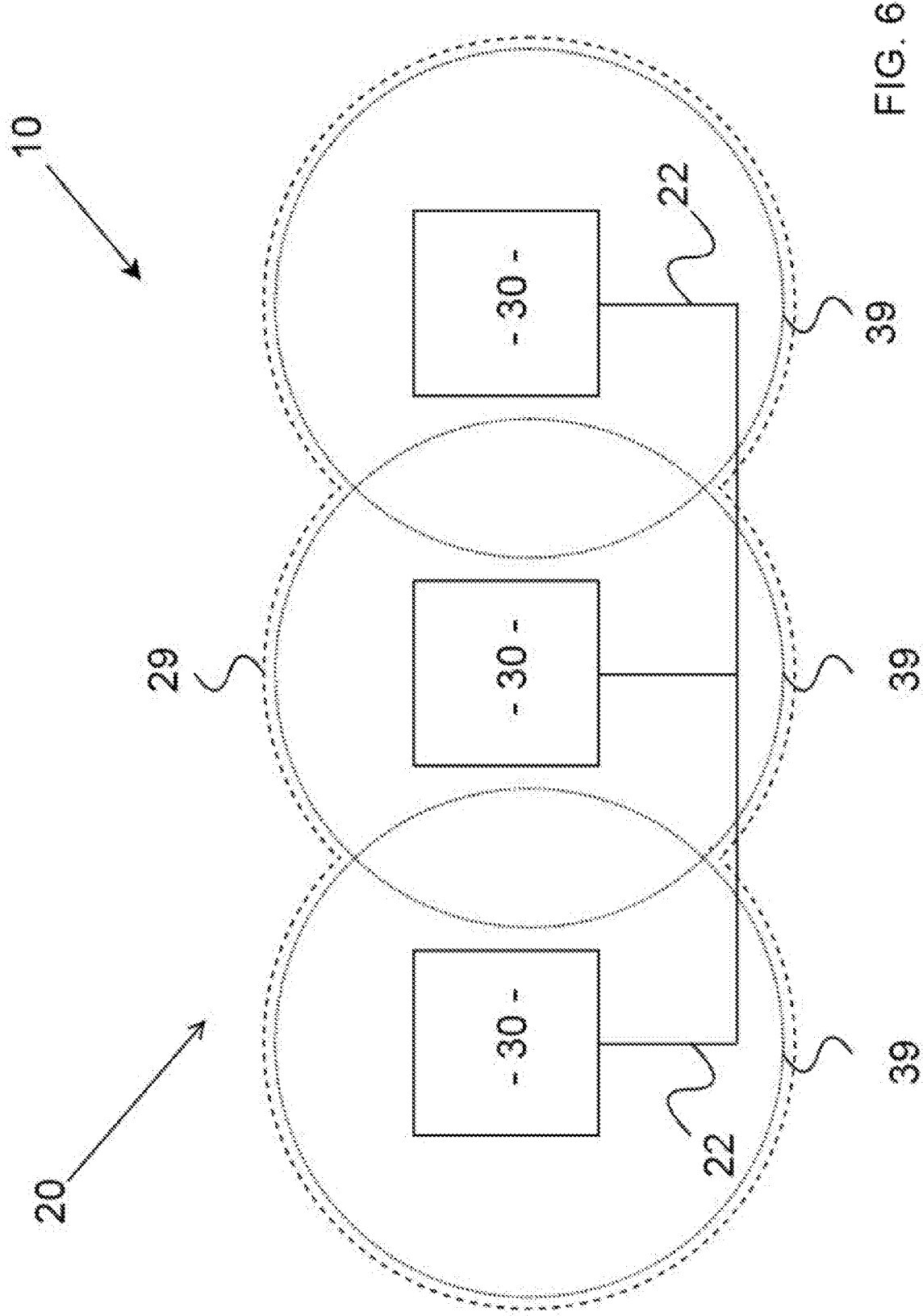
FIG. 6 is a diagrammatic representation of one illustrative embodiment of a radio frequency spectrum management system in accordance with the present invention.

As stated above, the present invention is directed to a radio frequency spectrum management system for detecting and redirecting interfering radio frequency signals, generally as shown as at 10 throughout the figures. More in particular, and with reference to the illustrative embodiment of FIG. 6, a radio frequency spectrum management system 10 in accordance with the present invention comprises a radio frequency spectrum management network 20. With continued reference to FIG. 6, in accordance with at least one embodiment of the present invention, a radio frequency spectrum management network 20 includes a plurality of radio frequency spectrum management devices 30 which are communicatively interconnected to one another via network connections 22. As may be further seen from the illustrative embodiment of FIG. 6, each of the plurality of radio frequency spectrum management devices 30 at least partially defines a device area of influence 39 over which a corresponding one of the plurality of radio frequency spectrum management devices 30 is operative. The illustrative embodiment of FIG. 6 further shows a network area of influence 29 which is at least partially defined as a summation of the plurality of device areas of influence 39.

Figure 3:
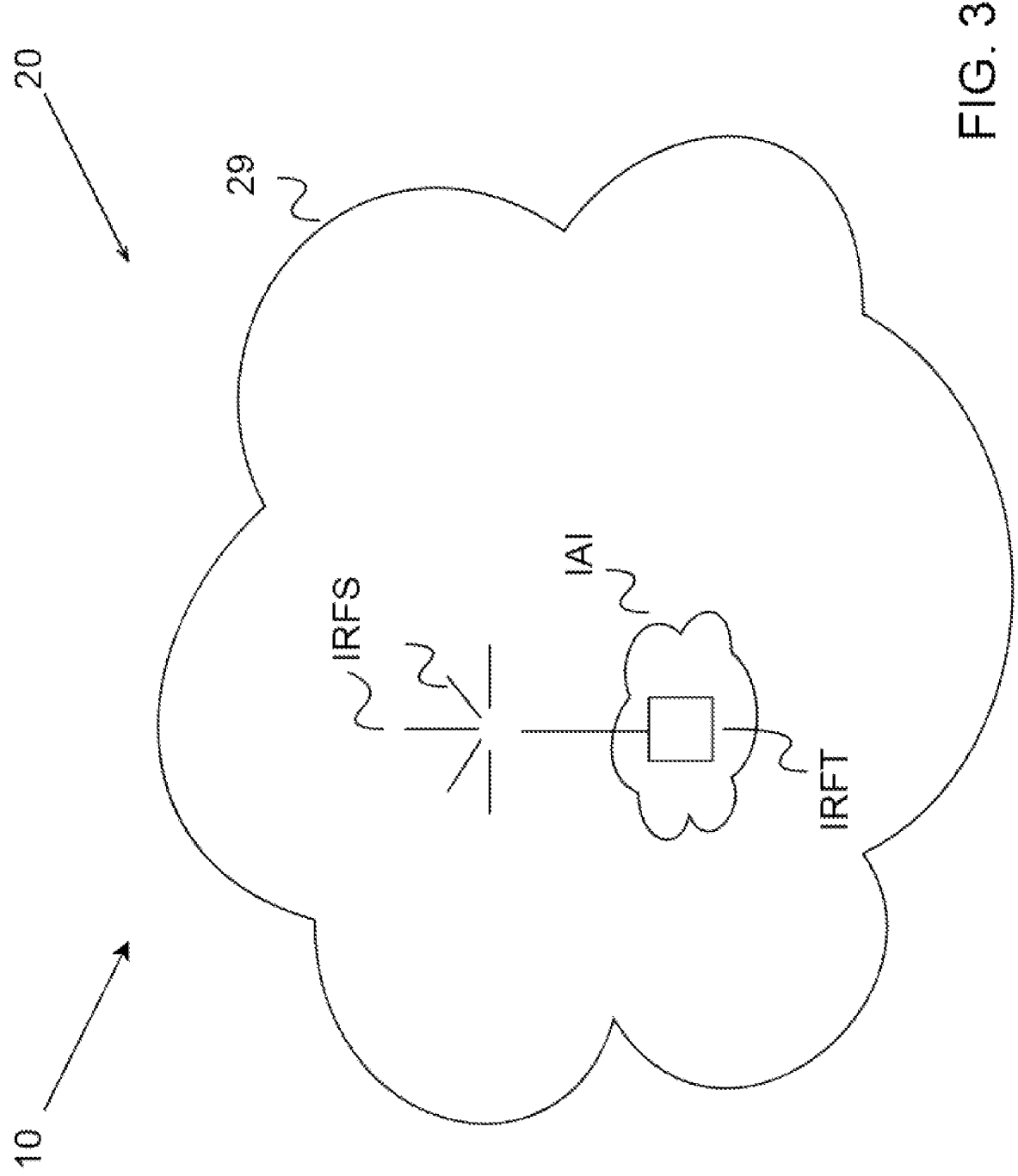
FIG. 3 is a diagrammatic representation of one illustrative embodiment of a network area of influence in accordance with the present invention having an interfering radio signal transmitter device transmitting interfering radio frequency signals therein.
Figure 4:
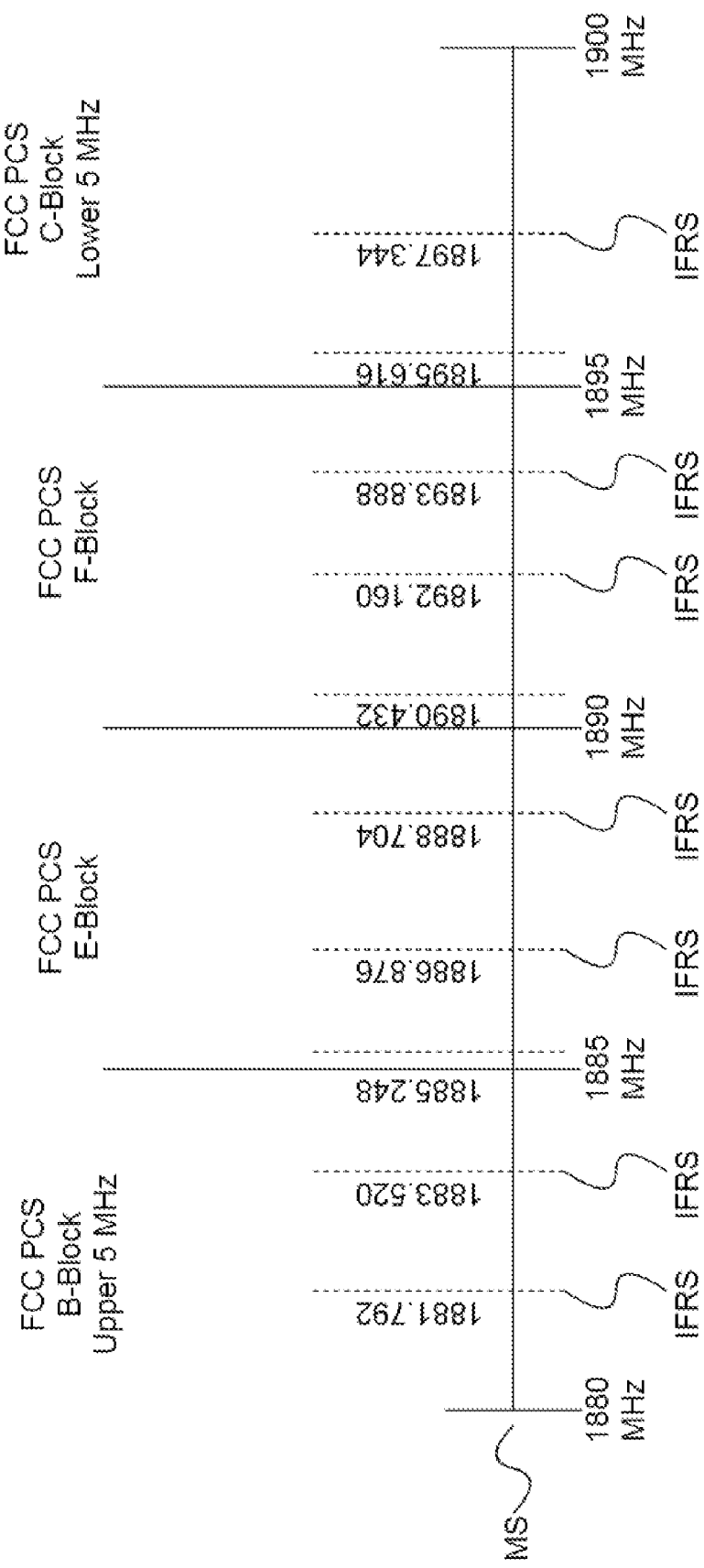
FIG. 4 is a diagrammatic representation of one illustrative embodiment of a managed radio frequency spectrum in accordance with the present invention.

With reference to the illustrative embodiment of FIG. 3, and as before, a radio frequency spectrum management system 10 in accordance with the present invention comprises a radio frequency spectrum management network 20 to manage a radio frequency spectrum over a network area of influence 29. With reference to FIG. 4, in at least one embodiment of the present invention, a managed radio frequency spectrum ("MS") comprises a bandwidth from about 1880 MHz to about 1900 MHz which, as noted above, is allocated in the United States for use by companies such as AT&T, Verizon, Sprint and T-Mobile, to provide cellular-type phone service to the public via established Commercial Mobile Radio System ("CMRS") specifications. Within the network area of influence 29, an interfering area of influence ("TAT") may exist by virtue of an interfering radio frequency transmitter ("IRFT") transmitting one or more interfering radio frequency signals ("IRFS") within the boundaries of the network area of influence 29. As further illustrated in FIG. 4, the IRFS may be transmitted at various radio frequencies encompassed by the MS, for example, the IRFS may be transmitted by a DECT transmitter configured for transmission over the DECT radio frequency spectrum bandwidth allocated for use in Europe and elsewhere, also comprising the bandwidth from about 1880 MHz to about 1900 MHz, thereby creating potential interference for the radio frequency signals specifically allocated for transmission across the MS in a particular network area of influence 29 such as, once again, by way of example only, AT&T, Verizon, Sprint, T-Mobile, etc.

Figure 1:
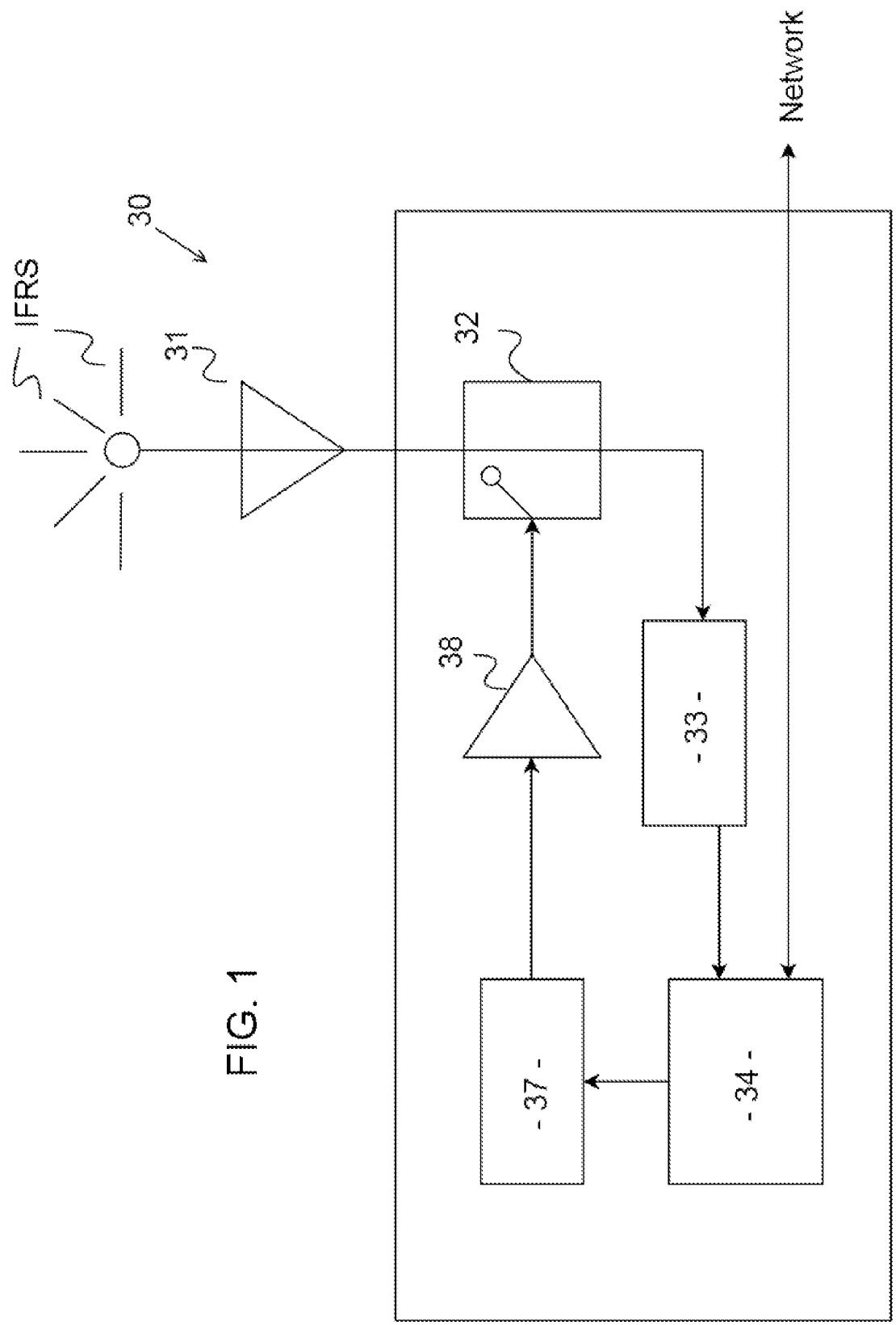
FIG. 1 is a diagrammatic representation of one illustrative embodiment of a radio frequency spectrum management device in accordance with the present invention detecting an interfering radio frequency signal.
Figure 2:
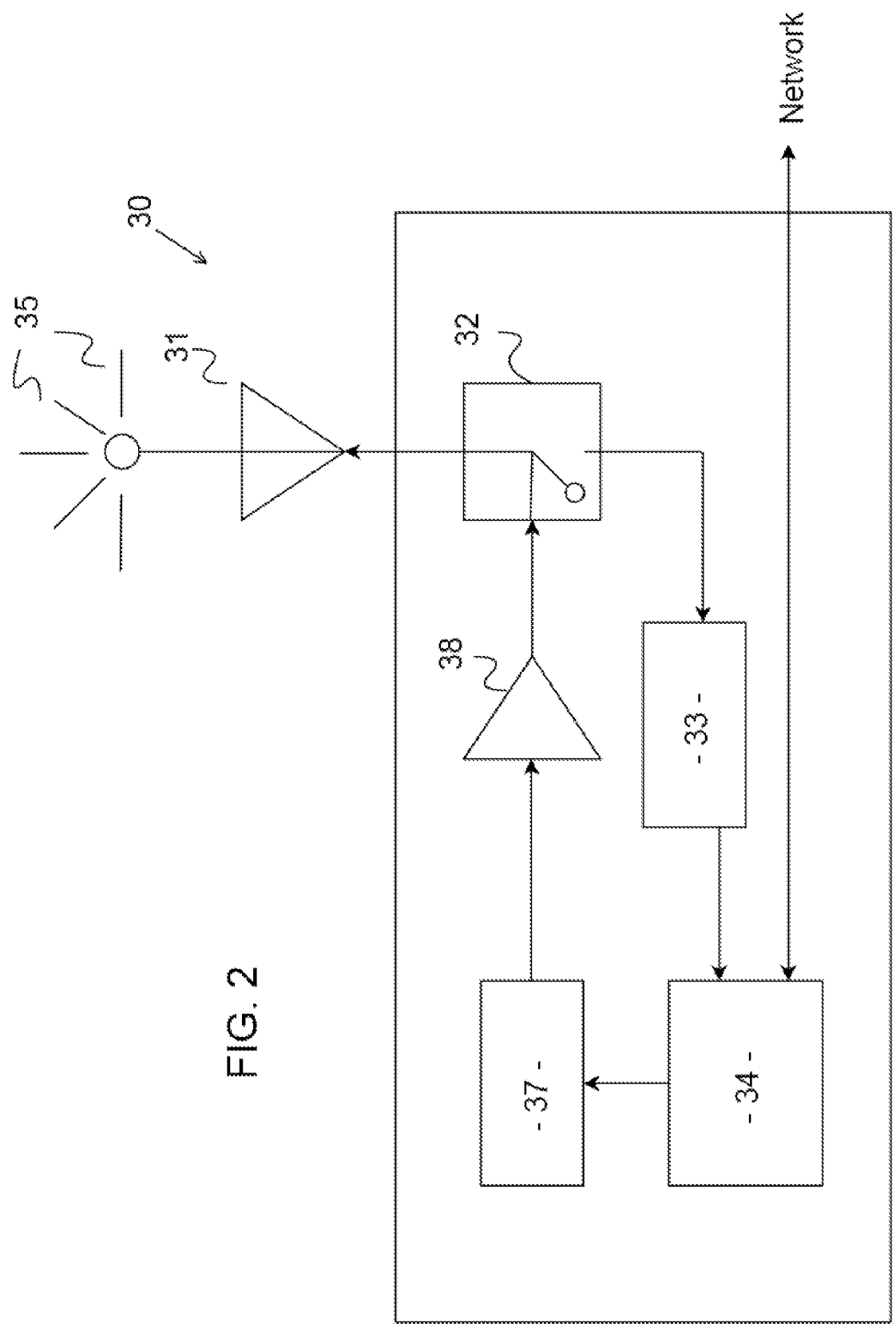
FIG. 2 is a diagrammatic representation of the illustrative embodiment of the radio frequency spectrum management device of FIG. 1 transmitting a redirecting clearance signal.

Turning next to the illustrative embodiments of FIGS. 1 and 2, diagrammatic representations of at least one embodiment of a radio frequency spectrum management device 30 in accordance with the present invention are presented. As may be seen from the figures, a radio frequency spectrum management device 30 includes an antenna 31. As will be appreciated by those of skill in the art, the antenna 31 at least partially defines a device area of influence 39 for a corresponding radio frequency spectrum management device 30.

With continued reference to FIGS. 1 and 2, in at least one embodiment of the present invention a radio frequency spectrum management device 30 includes a switching unit 32. As shown in the illustrative embodiment of FIG. 1, the switching unit 32 is configured to allow FRS detected by the antenna 31, within the device area of influence 39 of the radio frequency spectrum management device 30, to be routed to a receiver 33 which receives the IFRS from the antenna 31. Alternatively, and as shown in the illustrative embodiment of FIG. 2, the switching unit 32 is configured to allow a redirecting clearance signal 35 to be transmitted over the device area of influence 39 of the radio frequency spectrum management device 30 via the antenna 31.

Looking further to the illustrative embodiments of FIGS. 1 and 2, a radio frequency spectrum management device 30 in accordance with at least one embodiment of the present invention further comprises a controller 34. As may be seen from the figures, controller 34 is disposed in communication with the receiver 33, such that the receiver 33 can convey information about an IFRS detected by the antenna 31 to the controller 34. More particular, in at least one embodiment, the controller 34 analyzes the IFRS detected by the antenna 31, and delineates a set of operative parameters for a redirecting clearance signal 35.

Figure 5:
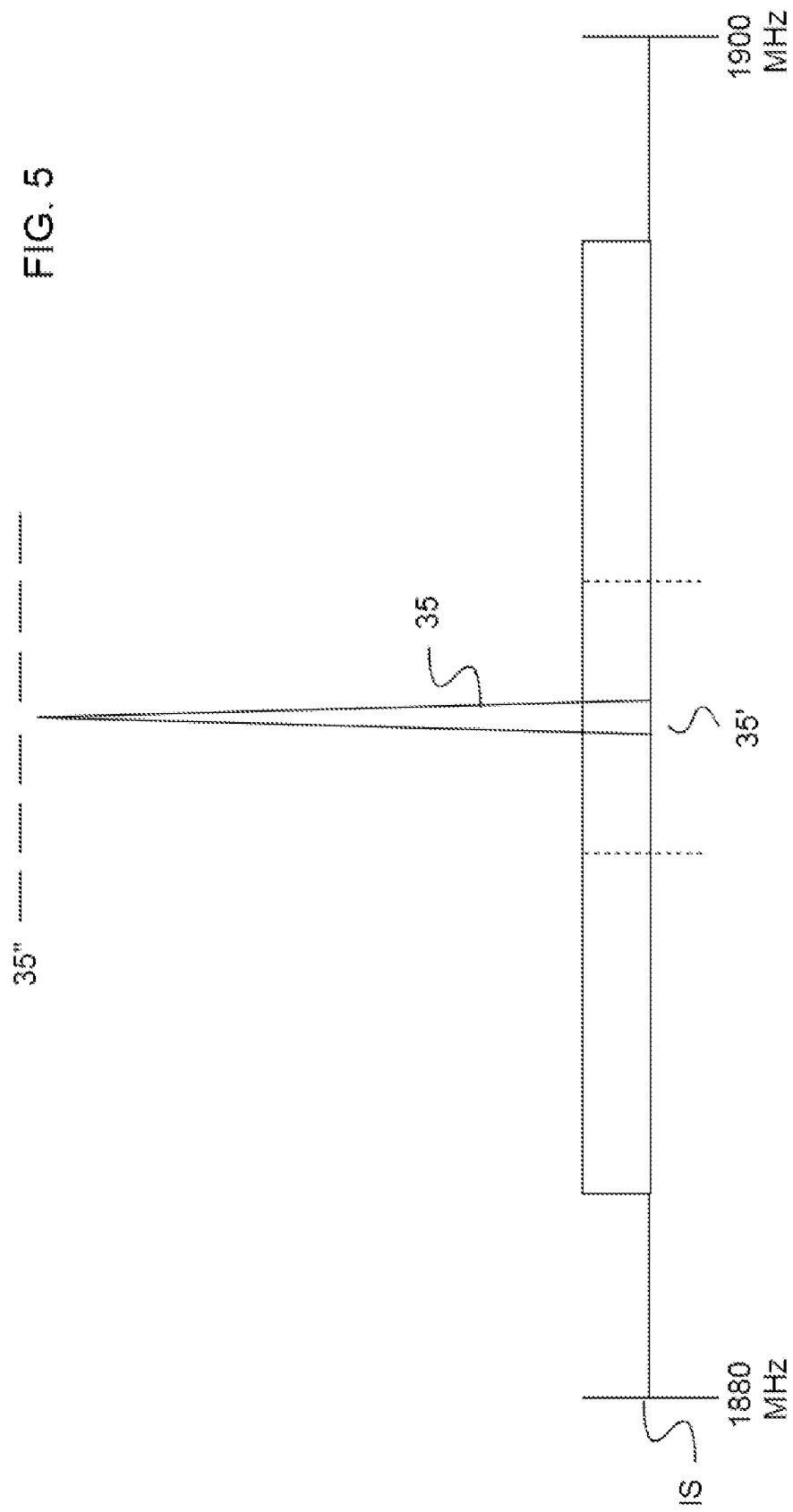
FIG. 5 is a diagrammatic representation of one illustrative embodiment of an interfering radio frequency spectrum illustrating transmission of a redirecting clearance signal therein in accordance with the present invention.

In at least one embodiment, the set of operative parameters for a redirecting clearance signal 35 include a predetermined clearance signal frequency 35', such as is shown in the illustrative embodiment of FIG. 5. As further shown in FIG. 5, in accordance with at least one embodiment of the present invention, a predetermined clearance signal frequency 35' is disposed along the radio frequency spectrum bandwidth allocated for DECT transmissions in Europe and elsewhere, namely, in the frequency range of 1880 MHz to 1900 MHz. As may also be seen from the illustrative embodiment of FIG. 4, this same radio frequency spectrum bandwidth in the United States is allocated for cellular-type phone service to the public. Therefore, the use of a DECT transmission device configured to transmit along the 1880 MHz to 1900 MHz bandwidth in Europe, is a source of potential inference when operated in the United States, as this same bandwidth is allocated for use by public cellular-type phone service providers.

With continued reference to FIG. 5, in accordance with at least one embodiment of the present invention, a predetermined clearance signal frequency 35' is selected to essentially mirror the frequency of an IFRS detected by the antenna 31. As such, by transmitting a redirecting clearance signal 35 at a predetermined clearance signal frequency 35' which is essentially the same as the frequency of an IFRS detected by the antenna 31, an IRFT will search for an open frequency along an interfering radio frequency spectrum ("IS") for further transmissions, thus abandoning transmission of the IRFS at the predetermined clearance signal frequency 35'.

Looking further to the illustrative embodiment of FIG. 5, the set of operative parameters for a redirecting clearance signal 35 delineated by controller 34 along a managed radio frequency spectrum ("MS") may also include a predetermined clearance signal amplitude 35". More in particular, the predetermined clearance signal amplitude 35" is selected so as to minimize the strength or amplitude at which a redirecting clearance signal 35 must be transmitted to cause an IRFT to search for an open frequency along an IS for further transmission. Minimization of the predetermined clearance signal amplitude 35" is necessary to assure that the transmission of redirecting clearance signals 35 by a radio frequency spectrum management device 30 in accordance with the present invention do not themselves become an IFRS.

While not shown in the illustrative embodiment of FIG. 5, a further operative parameter for a redirecting clearance signal 35 includes a predetermined clearance signal broadcast period. Similar to the predetermined clearance signal amplitude 35", the predetermined clearance signal broadcast period is selected so as to minimize the amount of time a redirecting clearance signal 35 must be transmitted to cause an IRFT to search for an open frequency along an IS for further transmissions. Minimization of the predetermined clearance signal broadcast period is similarly necessary to assure that the transmission of redirecting clearance signals 35 by a radio frequency spectrum management device 30 in accordance with the present invention do not become an IFRS in and of itself.

Figure 7:
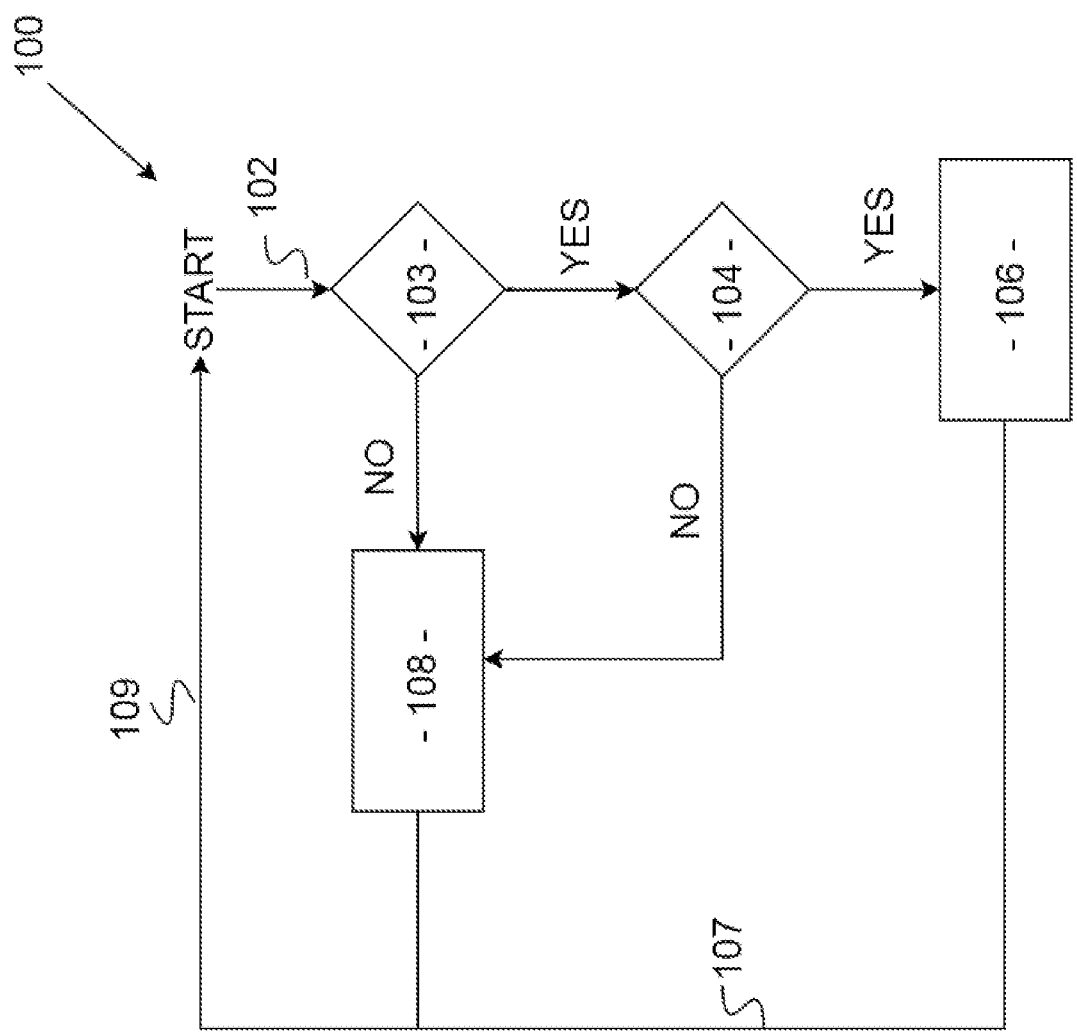
FIG. 7 is a diagrammatic representation of one illustrative embodiment of a radio frequency spectrum management method in accordance with the present invention.

As previously indicated, the present invention is further directed to a radio frequency spectrum management method, generally as shown as at 100 in FIG. 7. In at least one embodiment, the present method 100 begins by scanning for one or more interfering radio frequency signal ("IRFS") 102, as shown in the illustrative embodiment of FIG. 7, over a managed radio frequency spectrum within an area of influence. As before, scanning for one or more IRFS 102 may be performed by a radio frequency spectrum management device over a device area of influence, as disclosed hereinabove. In at least one embodiment of the present method 100, scanning for one or more IRFS 102 is accomplished via a radio frequency spectrum management network, comprising a plurality of radio frequency spectrum management devices disposed in operative communication with one another, as also disclosed hereinabove, over a network area of influence.

With reference once again to the illustrative embodiment of FIG. 7, the present method also includes detecting one or more IRFS 103. Once one or more IRFS has been detected, the present method 100 further comprises delineating a set of operative parameters for a redirecting clearance signal 104. In accordance with at least one embodiment of the present method 100, the set of operative parameters for a redirecting clearance signal includes a predetermined clearance signal frequency. In at least one further embodiment, the set of operative parameters for a redirecting clearance signal includes a predetermined clearance signal amplitude. In still one further embodiment of the present method 100, the set of operative parameters for a redirecting clearance signal includes a predetermined clearance signal broadcast period.

Once a set of operative parameters for a redirecting clearance signal have been delineated, the preset method 100 comprises activating a radio frequency transmitter for at least one radio frequency spectrum management device 106, such as shown in the illustrative embodiment of FIG. 7. The present method 100 further comprises transmitting at least one redirecting clearance signal 107 from one or more radio frequency transmitter over a managed radio frequency spectrum within an area of influence. More in particular, in at least one embodiment, the present method 100 comprises transmitting at least one redirecting clearance signal 107 at a predetermined clearance signal frequency over the managed radio frequency spectrum within the area of influence. In yet one further embodiment, the present method 100 comprises transmitting at least one redirecting clearance signal 107 having a predetermined clearance signal amplitude, and in still one further embodiment, the present method includes transmitting a redirecting clearance signal for a predetermined clearance signal broadcast period.

Looking once again to the illustrative embodiment of FIG. 7, the present radio frequency spectrum management method 100 further comprises deactivating the radio frequency transmitter 108 of one or more radio frequency spectrum management devices. More in particular, after transmitting at least one redirecting clearance signal 107, for a predetermined clearance signal broadcast period, a controller directs a corresponding radio frequency transmitter to cease transmission.

Lastly, the present radio frequency spectrum management method 100 includes rescanning for an IFRS 109 within a managed radio frequency spectrum over an area of influence. Assuming the results are negative, the present method 100 returns to scanning for one or more IRFS 102, as shown in the illustrative embodiment of FIG. 7. If an IFRS is detected upon rescanning 109, the present method 100 comprises delineating a revised set of operative parameters for a redirecting clearance signal 104', and transmitting at least one revised redirecting clearance signal 107' from one or more radio frequency transmitter over a managed radio frequency spectrum within an area of influence, until such time as rescanning for an IFRS 109 returns negative results.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A radio frequency spectrum management method comprising:
    scanning a managed radio frequency signal within a managed radio frequency spectrum via a radio frequency spectrum management network,
    delineating a set of operative parameters for a redirecting clearance signal,
    defining a predetermined clearance signal amplitude, wherein the predetermined clearance signal amplitude is selected to minimize the amplitude at which a redirecting clearance signal is to be transmitted,
    activating a radio frequency transmitter for at least one radio frequency spectrum management device,
    transmitting at least one redirecting clearance signal from the radio frequency transmitter,
    deactivating the radio frequency transmitter, and
    rescanning the managed radio frequency spectrum within the area of influence for interfering radio frequency signals.

2. The method of claim 1 wherein said step of scanning a managed radio frequency signal within the managed radio frequency spectrum further comprises detecting an interfering radio frequency signal.

3. The method of claim 2 wherein said step of detecting an interfering radio frequency signal further comprises analyzing the detected interfering radio frequency signal via a controller.

4. The method of claim 1 wherein said step of defining a predetermined clearance signal further comprises defining the predetermined clearance signal amplitude via a controller.

5. The method of claim 1 wherein said step of delineating a set of operative parameters for redirecting clearance signal further comprises defining a predetermined clearance signal frequency.

6. The method of claim 1 wherein said step of delineating a set of operative parameters for a redirecting clearance signal further comprises defining a predetermined clearance signal broadcast period, wherein the predetermined clearance signal broadcast period is selected so as to minimize the amount of time a redirecting clearance signal is to be transmitted.

7. The method of claim 1 wherein said step of transmitting at least one redirecting clearance signal from the radio frequency transmitter further comprises directing a corresponding radio frequency transmitter to cease transmission.

\* \* \* \* \*